May 26, 1959     R. P. MORK     2,888,542

HEATING APPARATUS

Filed Sept. 28, 1955

INVENTOR
RAYMOND P. MORK
By Elmer J. Jorn
ATTORNEY

United States Patent Office 2,888,542
Patented May 26, 1959

2,888,542
HEATING APPARATUS

Raymond P. Mork, Needham, Mass., assignor to Raytheon Manufacturing Company, Waltham, Mass., a corporation of Delaware Application September 28, 1955, Serial No. 537,084

5 Claims. (Cl. 219—10.55)

This invention relates generally to heating apparatus, and more particularly to an oven-type microwave heating device.

In known heating devices of this type, used, for example, in cooking foodstuffs by subjecting them to radiated high frequency energy, the oven consists of a metal enclosure wherein the food to be cooked may be placed, and into which microwave energy is coupled from a suitable source through an antenna, iris, or horn. The energy thus supplied enters the food, quickly and efficiently cooking it to the desired degree.

With these devices, the problem of adequately cleaning the oven after use has proven to be an undesirable and annoying feature to the consumer who may be utilizing the device. Since the food is placed directly into the oven portion of the device, vapors and grease emitted from the food when it becomes heated spatter to, and collect on, all sections of the interior surface of the oven. If a stirrer for altering the oven heat pattern is projected into the oven structure, as is now common, it also is subjected to the spattering grease, as is the microwave plumbing which is used to feed the energy into the oven.

With present microwave ovens, the cleaning problem is further complicated because the opening in the oven wall which provides access for the insertion of food is preferably made considerably smaller than the overall oven size in order to provide a microwave seal around the adjacent door, which covers the opening when the oven is in use. As the result, the interior spaces of the oven furthest from the opening are difficult to reach for proper cleaning.

It is, therefore, the prime purpose of the present invention to provide an improved microwave oven structure which overcomes and eliminates the heretofore described undesirable features of presently-known devices. To accomplish this purpose, there is provided an interior lining or liner which is positioned inside of the oven enclosure. The liner is constructed of low-loss material which is at least partially transparent to microwave energy so that the cooking process is not interfered with, but the emitted vapors and grease are caught and retained on the walls of the liner. However, the liner is made smaller than the overall oven size thereby allowing easy removal, whereupon the liner may be quickly and easily cleaned, and reinserted into the oven.

Figure 1:
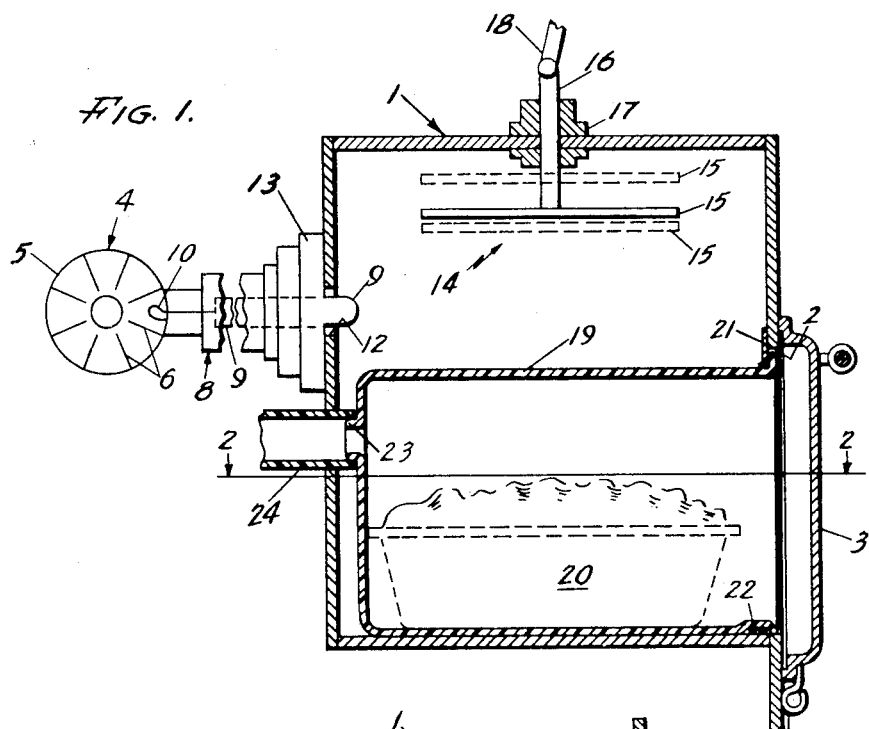
Figure 2:
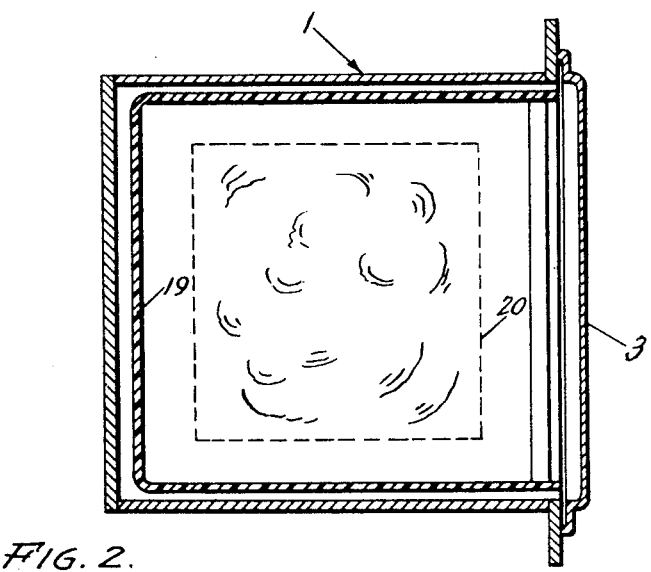

The invention will be better understood as the following description proceeds, taken in conjunction with the accompanying drawing wherein:

Fig. 1 is a cross-sectional side view of a microwave oven showing the interior lining; and Fig. 2 is a cross-sectional top view of the structure of Fig. 1 taken on the line 2—2.

Referring now to the drawing, there is shown a hollow, rectangular, prismoidal enclosure or cavity 1 made of a suitable metal and having rather thin walls. In order to allow access to the interior of the oven for placing food therein and for removing food therefrom, a rectangular opening 2 is provided in the front wall of oven 1, this opening being closable by means of a hinged metal door 3. When door 3 is closed, the enclosure 1 is entirely closed except for an opening 12 for the exciting means, to be described hereinafter.

Numeral 4 generally designates an electron discharge device of the magnetron type, which includes, for example, an evacuated envelope 5, made of highly conductive material, such as copper, and provided with a plurality of inwardly-directed, radially-disposed anode vanes 6. The arrangement is such that each pair of adjacent vanes 6 forms, together with that portion of the envelope lying therebetween, a cavity resonator whose natural resonant frequency is, as is well known to those skilled in the art, a function of the geometry of the physical elements making up the same. For the purposes of the present invention, it is desirable that the dimensions of each such cavity resonator be such that the wavelength of the electrical oscillations adapted to be generated therein has a predetermined value, for example, of the order of ten centimeters. Wavelengths of this order lie in the microwave region of the frequency spectrum. However, this invention is equally applicable to radio-frequency energy of longer or shorter wavelengths.

Centrally located in envelope 5 is a highly electron-emissive cathode member 7, for example, of the well-known alkaline-earth metal oxide type, said cathode member being provided with conventional means (not shown) for raising the temperature thereof to a level sufficient for thermionic emission. The electron discharge device 4 is completed by magnetic means (not shown) for establishing a magnetic field in a direction transversely of the electron path between the cathode and anode members.

Magnetron 4 is energized from any suitable source (not shown), and, when so energized, delivers high frequency electromagnetic energy to a coaxial transmission line 8, the inner conductor 9 of which is coupled to oscillator 4 by a loop 10, and the outer conductor of which is connected to envelope 5. The inner conductor 9 of line 8 extends directly into the interior of oven 1 through a suitable opening 12 provided in the rear wall thereof, while the outer conductor of said line is connected to the rear wall of the oven 1 by a suitable fastening means 13.

The top wall of oven 1 has provided therewith a "stirrer" or "mode changer" structure, designated generally at 14, which functions to change the boundary conditions of oven 1, thereby changing the field distribution of the microwave energy in the cavity. As shown, this structure may comprise a thin metallic plate member 15 fixed to a shaft 16, which extends through the upper wall of oven 1. Shaft 16 is mounted for vertical reciprocation with respect to oven 1 in a suitable bearing 17 fixed to the top wall of the oven. A link 18 connects shaft 16 to a suitable locomotive source (not shown) whereby plate 15 may be reciprocated at a desired rate between the dotted-line positions shown to accomplish the desired stirring of the energy in the oven.

In order to prevent cooking vapors from collecting on the stirrer structure and interior surfaces of the oven, the oven is provided with an interiorly-positioned liner 19, which may occupy only a relatively small portion of the total volume of oven 1. Liner 19 may comprise, for example, a rectangularly shaped, box-like enclosure having one end open and in coincidence with access aperture 2. The liner is made of a suitable material which is at least partially transparent to microwave frequencies, such as Fiberglas, for example, so that the microwave energy supplied to oven 1 may penetrate the liner and properly cook the food contents of a container 20 placed on the floor thereof. Liner 19 may have a suitable flexibility which allows it to be easily inserted into oven 1, and held in place by the slight pressure exerted on clamping means 21 and 22.

As can be seen, any vapors or grease spattered from the food in container 20 during cooking will collect on the walls of inner enclosure 19 rather than on the inner surface of oven 1, stirrer 14, and energizing means 4. The liner 19 may then be easily removed through access 2, washed and reinserted into oven 1. If desired, the liner 19 may be provided with a lip 23 connected to an outlet pipe 24 to further facilitate removal of the undesirable cooking vapors. Since the liner may be made any size consistent with the size of access aperture 2, the invention further allows the use of larger ovens with their more favorable and uniform heat patterns, combined with the use of a small access aperture to provide the desired microwave seal around the door structure, while at the same time eliminating the cleaning problem which has heretofore militated against the use of such an arrangement.

Although there has been described what is considered to be a preferred embodiment of the present invention, various adaptations and modifications thereof may be made without departing from the spirit and scope of the invention as defined in the appended claims.

What is claimed is:

1. High frequency heating apparatus comprising a metallic enclosure, means for supplying high frequency electromagnetic waves of a predetermined wavelength to the interior of said enclosure, a second enclosure positioned entirely within said metallic enclosure whereby said second enclosure has portions intermediate the interior surfaces of said first enclosure and the interior of said second enclosure, said second enclosure being at least partially transparent to said electromagnetic waves over all portions thereof, and access means positioned in an outer surface of said metallic enclosure and adapted to allow a body to be heated to be placed within said second enclosure.

2. High frequency heating apparatus comprising a metallic enclosure, means for supplying high frequency electromagnetic waves of a predetermined wavelength to the interior of said enclosure, a stirrer structure extending into the interior of said metallic enclosure, a second enclosure positioned entirely within said metallic enclosure whereby said second enclosure has portions intermediate the interior surfaces of said first enclosure and the interior of said second enclosure, said second enclosure being at least partially transparent to said electromagnetic waves over all portions thereof, and access means positioned in an outer surface of said metallic enclosure and adapted to allow a body to be heated to be placed within said second enclosure.

3. High frequency heating apparatus comprising a metallic enclosure, means for supplying high frequency electromagnetic waves of a predetermined wavelength to the interior of said enclosure, said metallic enclosure having an access aperture therein, a second enclosure positioned entirely within said metallic enclosure whereby said second enclosure has portions intermediate the interior surfaces of said first enclosure and the interior of said second enclosure, said second enclosure being at least partially transparent to said electromagnetic waves over all portions thereof and having an open end coincident with said access aperture, and a hinged door normally covering said access aperture and said open end of said second enclosure, but adapted to open to allow a body to be heated to be placed within said second enclosure.

4. High frequency heating apparatus comprising a metallic enclosure, means for supplying high frequency electromagnetic waves of a predetermined wavelength to the interior of said enclosure, said metallic enclosure having an access aperture therein, a flexible second enclosure positioned entirely within said metallic enclosure whereby said second enclosure has portions intermediate the interior surfaces of said first enclosure and the interior of said second enclosure, said second enclosure being at least partially transparent to said electromagnetic waves over all portions thereof, clamping means for removably holding said second enclosure within said metallic enclosure, and a hinged door normally covering said access aperture and said open end of said second enclosure, but adapted to open to allow a body to be heated to be placed within said second enclosure.

5. High frequency heating apparatus comprising a metallic enclosure, means for supplying high frequency electromagnetic waves of a predetermined wavelength to the interior of said enclosure, said metallic enclosure having an access aperture therein, a flexible second enclosure positioned entirely within said metallic enclosure whereby said second enclosure has portions intermediate the interior surfaces of said first enclosure and the interior of said second enclosure, said second enclosure being at least partially transparent to said electromagnetic waves over all portions thereof and having an open end, clamping means for removably holding said second enclosure with its open end in coincidence with said access aperture, and a hinged door normally covering said access aperture and said open end of said second enclosure, but adapted to open to allow a body to be heated to be placed within said second enclosure.

References Cited in the file of this patent
UNITED STATES PATENTS

| 2,519,795 | Smullin | Aug. 22, 1950 |
| 2,540,148 | Tawney | Feb. 6, 1951 |
| 2,602,134 | Nelson | July 1, 1952 |
| 2,632,090 | Revercomb et al. | Mar. 17, 1953 |
| 2,748,239 | Long et al. | May 29, 1956 |
| 2,773,245 | Goldstein et al. | Dec. 4, 1956 |
| 2,820,127 | Argento et al. | Jan. 14, 1958 |